W. JUNEAU.
RUNNING GEAR FOR MOTOR VEHICLES.
APPLICATION FILED JULY 11, 1910.
977,407.
Patented Nov. 29, 1910.
2 SHEETS—SHEET 1.
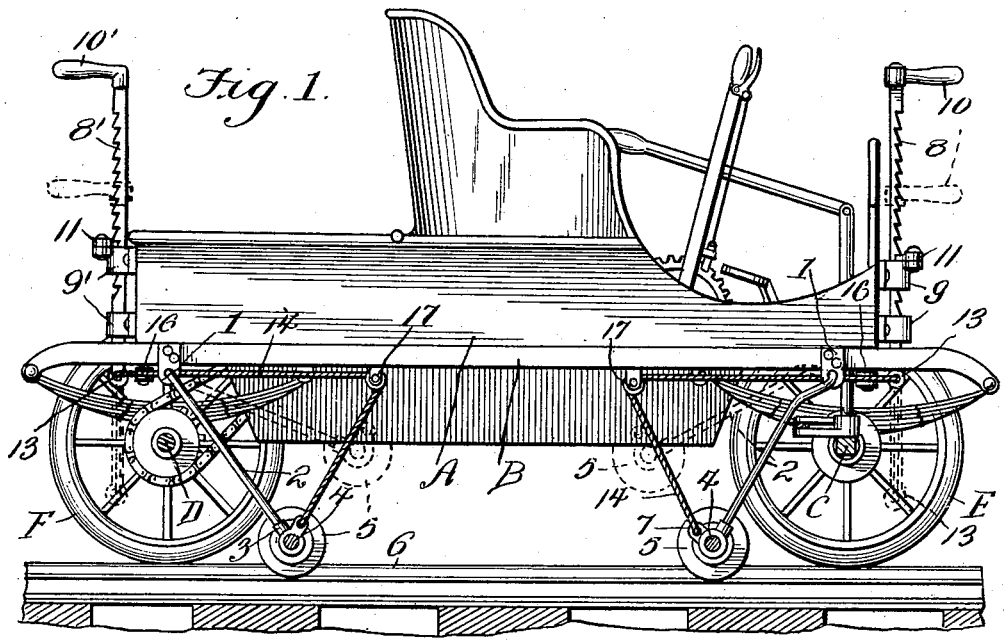
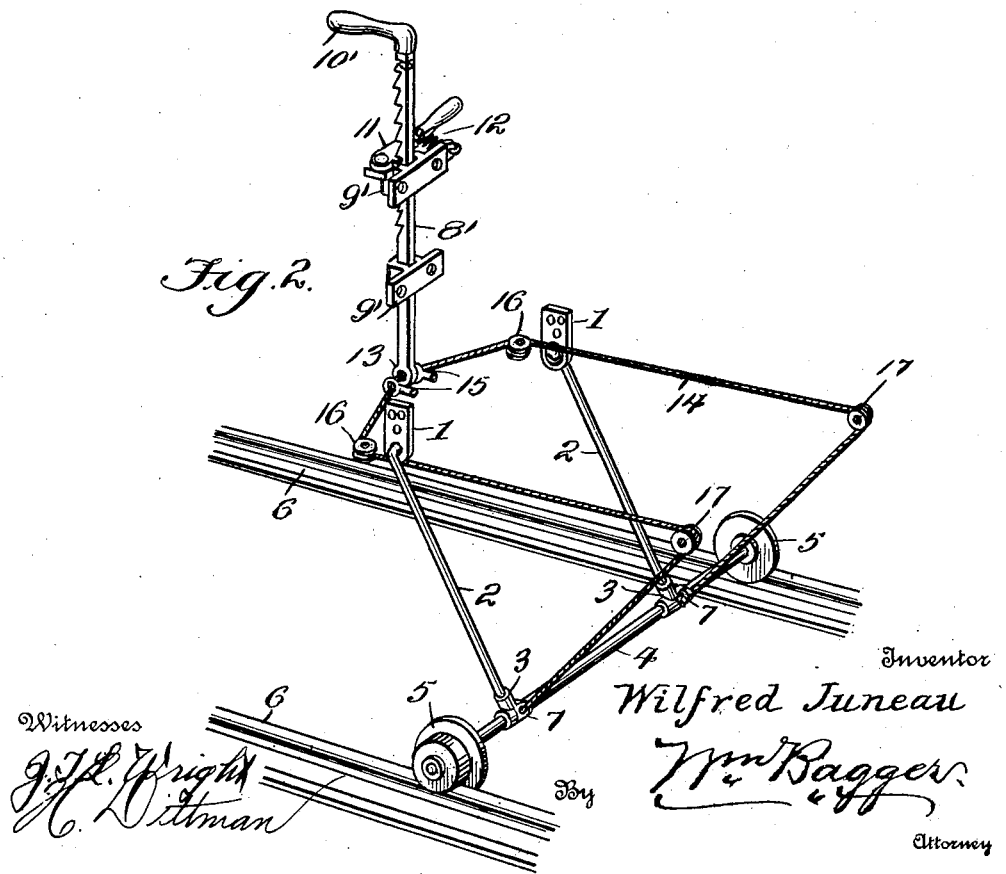
Inventor
Wilfred Juneau W. JUNEAU.
RUNNING GEAR FOR MOTOR VEHICLES.
APPLICATION FILED JULY 11, 1910.
977,407.
Patented Nov. 29, 1910.
2 SHEETS—SHEET 2.
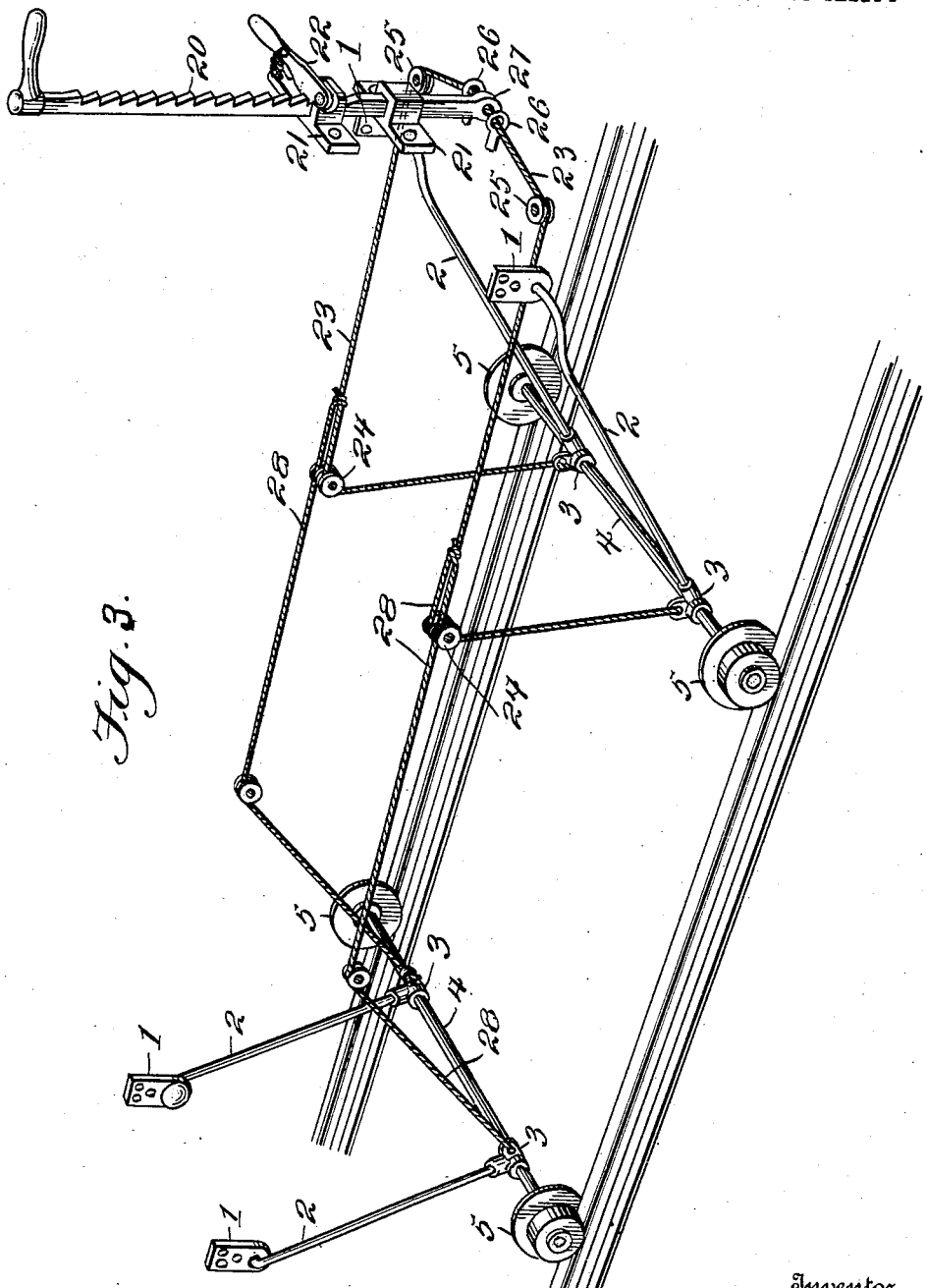
Witnesses
J. T. Wright
H. Dittman
Inventor
Wilfred Juneau,
By Wm. Bagger.
Attorney

UNITED STATES PATENT OFFICE.

WILFRED JUNEAU, OF MARKSVILLE, LOUISIANA.

RUNNING-GEAR FOR MOTOR-VEHICLES.

977,407.  Specification of Letters Patent.  Patented Nov. 29, 1910.

Application filed July 11, 1910. Serial No. 571,321.

*To all whom it may concern:*

Be it known that I, WILFRED JUNEAU, a citizen of the United States, residing at Marksville, in the parish of Avoyelles and State of Louisiana, have invented certain new and useful Improvements in Running-Gear for Motor-Vehicles, of which the following is a specification.

This invention relates to an improved running gear for motor vehicles, and it has for its objects to provide a simple and improved attachment, capable of being readily applied to a motor vehicle of ordinary construction, whereby the same may be guided to run upon the rails of an ordinary railroad track.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a side elevation showing a motor vehicle equipped with one form of the improved attachment. Fig. 2 is a perspective detail view showing a portion of the device detached. Fig. 3 is a perspective detail view showing a slightly modified form of the invention, detached.

Corresponding parts in the several figures are denoted by like characters of reference.

The motor vehicle A, to which, in Fig. 1 of the drawings, the invention has been shown applied, is of any conventional construction, including the frame B, axles C, D and wheels E, F. The frame is provided with lugs or brackets 1, 1 with which links 2, 2 are pivotally connected; it being understood that each side of the frame is provided with link carrying brackets adjacent to its front and rear ends, as will be readily seen by reference to the several figures of the drawings. Each pair of links, at the front and rear ends of the frame, is provided with bearings 3 for a shaft or axle 4 carrying flanged wheels 5, 5 which are gaged to engage the rails 6, 6 of an ordinary railroad track.

Under the construction shown in Figs. 1 and 2 of the drawings, the bearings 3 of each shaft 4 are provided with apertured lugs 7. Ratchet bars 8, 8' are supported slidably in suitable keepers 9, 9' upon the front and rear ends, respectively, of the body of the motor vehicle, said ratchet bars being provided at their upper ends with handles 10, 10' for convenience in manipulation. Latch members 11 are pivotally supported upon the uppermost keepers 9 and 9' for the purpose of engaging the ratchet bars which may thereby be held in adjusted position, and each of said latch members is connected by a spring 12 with the keeper upon which it is mounted for the purpose of retaining it in ratchet engaging position.

The lower end of each of the ratchet bars 8, 8' is provided with an aperture 13 for the passage of a flexible element 14, the ends of which are connected with the lugs 7 upon the bearings supporting the shafts 4 adjacent to the front and rear ends, respectively, of the vehicle. The flexible elements 14 are guided through eyes 15 and over pulleys 16, 17 suitably disposed upon the frame so that by depressing the ratchet bars, the shafts carrying the wheels 5 may be swung from a rail-engaging position to the positions indicated in dotted lines in Fig. 1 of the drawings, said shafts moving in the arcs described by the links 2.

It will be readily understood that when the motor vehicle is traveling upon an ordinary road, the flanged wheels will be elevated to the position shown in dotted lines in Fig. 1. Whenever it shall be desired to travel upon the rails of a railroad track, and the supporting wheels of the vehicle have been placed upon the rails, the ratchet bars are elevated, thus permitting the flanged wheels 5 to drop to the rail-engaging position shown in Figs. 1 and 2, thus guiding the vehicle safely upon the rails when in motion.

As will be seen, under the construction shown in Figs. 1 and 2, the rail engaging wheels at the front and rear ends of the vehicle are independently operable by the ratchet bars 10 and 10'. Under the construction illustrated in Fig. 3, the arrangement of the brackets 1, links 2, bearing members 3, axles 4 and flanged wheels 5 is identical with that hereinbefore described, but only a single ratchet bar, here designated 20, for simultaneously adjusting the two sets of flanged rail engaging wheels has been shown, said ratchet bar being slidable in keepers 21 designed to be mounted upon the front end of the vehicle body, said ratchet bar being held in adjusted position by a spring actuated latch member 22. A flexible element 23, the ends of which are connected with the bearing members 3 of the forward shaft 4 is guided over suitably disposed pulleys 24, 25 and through eyes 26, and said flexible element is threaded through an aperture 27 at the lower end of the ratchet bar. Suitably guided flexible elements 28 connect the bearings of the rearward shaft 4 with the flexible element 23, so that when strain is exercised upon the latter to elevate the forward wheel carrying shaft 4, such strain will be transmitted through the flexible elements 28 to the rearward wheel carrying shaft 4, thereby causing the said shafts to be simultaneously raised or lowered, as the case may be.

Other means than those herein shown may be utilized for adjusting the flanged guide wheels to a rail engaging or non-engaging position, and no limitation is made to the precise means herein shown.

Having thus described the invention, what is claimed as new, is:—

1. A motor vehicle, a pair of links pivotally connected therewith, a wheel carrying shaft supported by the links, bearings for said shaft, a slidably supported member, a suitably guided flexible element connecting said member with the shaft bearings, and means for supporting the slidable member in adjusted position.

2. A motor vehicle, a pair of links pivotally connected therewith, shaft bearings carried by said links, a shaft supported in the bearings and having flanged guide wheels, a vertically slidable ratchet bar, a spring actuated latch to retain said bar in adjusted position, and a suitably guided flexible element connecting the ratchet bar with the shaft bearings.

3. A motor vehicle, pairs of links connected pivotally with the frame of said vehicle adjacent to the front and rear ends, respectively, said links being provided with shaft bearings, shafts supported in said bearings in proximity to the front and rear axles, respectively, of the vehicle, flanged guide wheels upon said shafts, and means whereby the front and rear wheel carrying shafts may be independently raised or lowered.

In testimony whereof I affix my signature in presence of two witnesses.

WILFRED JUNEAU.

Witnesses:
T. J. ARMITAGE,
J. A. MORROW.